US011966811B2

(12) United States Patent
Fernandez-Dorado et al.

(10) Patent No.: US 11,966,811 B2
(45) Date of Patent: Apr. 23, 2024

(54) MACHINE VISION SYSTEM AND METHOD WITH ON-AXIS AIMER AND DISTANCE MEASUREMENT ASSEMBLY

(71) Applicant: COGNEX CORPORATION, Natick, MA (US)

(72) Inventors: Jose Fernandez-Dorado, Aachem (DE); Pablo Garcia-Campos, Aachen (DE); Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 364 days.

(21) Appl. No.: 17/034,904

(22) Filed: Sep. 28, 2020

(65) Prior Publication Data
US 2022/0100979 A1 Mar. 31, 2022

(51) Int. Cl.
*G06K 7/10* (2006.01)
*G01S 7/481* (2006.01)
*G01S 17/46* (2006.01)
*G02B 3/12* (2006.01)
*G02B 27/14* (2006.01)

(52) U.S. Cl.
CPC ........ *G06K 7/10831* (2013.01); *G01S 7/4816* (2013.01); *G01S 17/46* (2013.01); *G02B 3/12* (2013.01); *G02B 27/141* (2013.01)

(58) Field of Classification Search
CPC ........ G06K 7/10831; G06K 7/10; G06K 7/00; G06K 7/14; G01S 7/4816; G01S 17/46
USPC ......................................... 235/454, 439, 435
See application file for complete search history.

(56) References Cited

U.S. PATENT DOCUMENTS

| | | | |
|---|---|---|---|
| 5,296,689 A | 3/1994 | Reddersen et al. |
| 5,627,360 A | 5/1997 | Rudeen |
| 5,912,451 A | 6/1999 | Gurevich et al. |
| 6,039,254 A | 3/2000 | Froese-Peeck et al. |
| 7,237,342 B2 | 7/2007 | Chen et al. |
| 7,296,749 B2 | 11/2007 | Massieu |
| 7,577,353 B2 | 8/2009 | Gaessler et al. |
| 9,202,094 B1 | 12/2015 | Chen et al. |
| 9,224,022 B2 | 12/2015 | Ackley et al. |
| 9,646,188 B1 | 5/2017 | Kuchenbrod et al. |
| 9,779,276 B2 | 10/2017 | Todeschini et al. |

(Continued)

FOREIGN PATENT DOCUMENTS

EP 3647989 A1 5/2020
JP H112679 A 1/1999

OTHER PUBLICATIONS

Kabachnik, Scanning Barcodes with Built-In Mobile Camera and HTML5, https://a.kabachnik.info/reading-barcodes-with-built-in-camera-with-html5.html, Oct. 31, 2016, 9 pages.

(Continued)

*Primary Examiner* — Edwyn Labaze
(74) *Attorney, Agent, or Firm* — Quarles & Brady LLP (57) ABSTRACT

An on-axis aimer and distance measurement apparatus for a vision system can include a light source configured to generate a first light beam along a first axis. The first light beam can project an aimer pattern on an object and a receiver can be configured to receive reflected light from the first light beam to determine a distance between a lens of the vision system and the object. One or more parameters of vision system can be controlled based on the determined distance.

19 Claims, 9 Drawing Sheets

(56) References Cited

U.S. PATENT DOCUMENTS

| | | |
|---|---|---|
| 10,121,039 B2 | 11/2018 | Todeschini et al. |
| 10,346,645 B1 | 7/2019 | Nunnink et al. |
| 2002/0149745 A1 | 10/2002 | Fukuma et al. |
| 2003/0226895 A1 | 12/2003 | Havens et al. |
| 2004/0118919 A1* | 6/2004 | Breytman ............ G06K 7/0004 |
| | | 235/454 |
| 2005/0011952 A1* | 1/2005 | Krichever .......... G06K 7/10811 |
| | | 235/462.23 |
| 2006/0038017 A1* | 2/2006 | Carlson .................... G02B 7/08 |
| | | 235/462.24 |
| 2007/0131770 A1* | 6/2007 | Nunnink ............ G06K 7/10732 |
| | | 235/462.41 |
| 2009/0072037 A1* | 3/2009 | Good ....................... G02B 7/08 |
| | | 235/462.35 |
| 2010/0155481 A1* | 6/2010 | Vinogradov ........... G06K 7/109 |
| | | 235/462.41 |
| 2011/0069299 A1* | 3/2011 | Hsu .......................... G01C 3/08 |
| | | 356/4.02 |
| 2011/0290886 A1 | 12/2011 | Carlson |
| 2016/0292477 A1 | 10/2016 | Bidwell |
| 2018/0184972 A1* | 7/2018 | Carmi .................. A61B 5/4872 |
| 2020/0284883 A1* | 9/2020 | Ferreira .................. G01S 17/10 |
| 2020/0319341 A1* | 10/2020 | Ollila ................. G01B 11/2513 |

OTHER PUBLICATIONS

Keyence Deutschland GmbH, Laserbeschriftung von Data Matrix- und Barcodes, https://www.keyence.de/landing/lpc/laserbeschriftung-rueckverfolgbarkeit.jsp, Copyright 2020 Keyence Corporation, 7 pages.

L-Trondirect, Intermec SF61B High Performance 2D Imager with Laser Aimer, https://www.l-trondirect.com/Intermec/SF61BHP-SA001, 2019, 3 pages.

Opaltec International Ltd., Mobile Computers, https://opaltechnology.com/technology/mobile-computers, Copyright OpalTec 1998-2020, 7 pages.

Opticon, MDI-2300 OEM Barcode Scan Engine—2D CMOS Imager with Auto-Focus, https://www.opticonusa.com/products/oem-solutions/mdi-2300.html, Copyright 2018 Opticon Inc., 1 page.

Scandit, Blurry Barcode Scanning . . . Why Bother?, https://www.scandit.com/blog/blurry-barcode-scanning-why-bother/, Feb. 13, 2012, 2 pages.

PCT International Search Report and Written Opinion, PCT/US2021/052159, dated Jan. 12, 2022, 14 pages.

\* cited by examiner

MACHINE VISION SYSTEM AND METHOD WITH ON-AXIS AIMER AND DISTANCE MEASUREMENT ASSEMBLY

FIELD

The present disclosure relates generally to machine vision systems and more particularly to a combined on-axis aimer and distance measurement assembly for controlling parameters of a vision system.

BACKGROUND

Machine vision systems (also simply termed "vision systems") use image acquisition devices that include image sensors to deliver information on a viewed subject. The system can then interpret this information according to a variety of algorithms to perform programmed decision-making or identification functions. For example, an image of an object containing features of interest to the system can be acquired by an on-board image sensor (also referred to as simply an "imager" or "sensor") in the visible or near visible light range under appropriate illumination, which can be based upon ambient light or light provided by an internal or external illuminator.

A common task for vision systems is the reading and decoding of symbology (e.g., one-dimensional and two-dimensional codes—also termed "IDs"), which are used in a wide variety of applications and industries and can take the form of ID barcodes, 2D DataMatrix Codes, QR Codes and Dot-Codes, among other. The image sensor acquires images (typically grayscale or color, and in one, two, or three dimensions) of the subject or object, and processes these acquired images using an on-board or interconnected vision system processor. The processor often includes both processing hardware and non-transitory computer-readable program instructions (software) that perform one or more vision system processes to generate a desired output based upon the image's processed information. This image information is typically provided within an array of image pixels each having various colors or intensities. In the example of an ID reader (also termed herein, a "reader"), the user or an automated process acquires n image of an object that is believed to contain one or more barcodes, 2D codes or other ID types. The image is processed to identify encoded features, which are then decoded by a decoding process or process to obtain the inherent alphanumeric data represented by the code.

SUMMARY

In accordance with an embodiment, an apparatus for automatically focusing a reader having an optical axis in a vision system includes an optics assembly having at least one lens and an image sensor, an on-axis aimer and distance measurement assembly and a processor. The on-axis aimer and distance measurement assembly can include a light source configured to generate a first light beam along a first axis, the first light beam configured to project an aimer pattern on an object, a receiver configured to receive reflected light from the object based on the first light beam, the reflected light provided to the receiver along a second axis, and a reflecting assembly. The reflecting assembly can be configured to direct the first light beam received from the light source so that the first light beam is projected onto the object coaxially with the reader optical axis. The reflecting assembly can be configured to direct the reflected light from the optical axis to the second axis. The processor device can be in communication with the receiver and the optics assembly and can be configured to determine a distance between the at least one lens and the object based on the reflected light and to focus the at least one lens based on the determined distance.

In accordance with another embodiment, an on-axis aimer and distance measurement apparatus for a vision system can include a light source configured to generate a first light beam along a first axis. The first light beam can be configured to project an aimer pattern on an object. The apparatus can also include a reflecting assembly configured to direct the first light beam received from the light source to be projected onto the object along a second axis. The reflecting assembly can be configured to receive reflected light from the first light beam on the object, along the second axis, and to direct the reflected light from the second axis to a third axis. The apparatus also includes a receiver configured to receive the reflected light along the third axis to determine a distance between a lens of the vision system and the object, and a processor device configured to control one or more parameters of the vision system for acquisition of an image of the object based on the determined distance.

In accordance with another embodiment, a method for acquiring an image of a symbol on an object using a vision system having at least one lens can include projecting a first light beam to the object coaxially with a reader optical axis of the vision system, to project an aimer pattern on the object and receiving reflected light from the object based on the first light beam, coaxially with the reader optical axis. The method can further include directing the reflected light to an axis different from the reader optical axis, determining a distance between the at least one lens of the vision system and the object based on the reflected, directed light from the first light beam, determining a desired optical power for the at least one lens based on the determined distance, adjusting a focus of the at least one lens based on the desired optical power, and acquiring an image of the symbol on the object. One or more processor devices can be used to determine the distance, determine the desired optical power and to adjust the focus.

BRIEF DESCRIPTION OF THE DRAWINGS

The present disclosure will hereafter be described with reference to the accompanying drawings, wherein like reference numerals denote like elements.

DETAILED DESCRIPTION

A common use for ID (e.g., barcode) readers is to track and sort objects along a line (e.g., a conveyor) in manufacturing and logistics operations. The ID reader, or more typically, a plurality (constellation) of readers can be positioned over the line at an appropriate viewing angle(s) to acquire any expected ID codes on the faces) of respective objects as they each move through the field of view. The ID reader can also be provided in a handheld configuration that allows the user to move from object to object, for example, on an inspection floor and vary the distance or relative angle between the reader and object surface at will. More generally, the focal distance of the ID reader with respect to the object can vary, depending on the placement of the reader with respect to the line and the size of the object.

In operation, some ID readers function to illuminate the scene containing one or more ID's (e.g., barcodes). This illumination can include aimers that project a colored dot on the region of interest in the imaged scene, whereby the user can center the image axis of the reader on the barcode within the imaged scene. Illumination can also include general illumination to allow acquisition of appropriately detailed images. The illuminated scene is then acquired by an image sensor within the imaging system through optics. The array sensor pixels is exposed, and the electronic value(s) generated for each pixel by the exposure is/are stored in an array of memory cells that can be termed the "image" of the scene. In the context of an ID-reading application, the scene can include an object of interest that has one or more IDs of appropriate dimensions and type. The ID(s) are part of the stored image.

ID readers may also include an automatic focusing (autofocus) functionality. For a conventional mechanical lens, the mechanical parts of the lens may be moved to adjust the focus and optical power. For a liquid lens, which has no mechanical moving parts, a voltage passed through the lens is varied to change the curvature of the liquid lens interface. The change in curvature leads to a change of the focal length of the lens. Existing techniques for providing auto-focus functionality to ID readers include an iterative sequence of low resolution images, and sweeping the optical power from minimum to maximum range values. However, these techniques have disadvantages. For example, the iterative sequence of images technique requires multiple images and the sweeping of optical power technique is time consuming, computationally intensive and slow.

Among other aspects, the present disclosure describes an apparatus and method for controlling parameters of a vision system using an on-axis aimer and distance measurement assembly or, more generally, for controlling system parameters based on distance information that can be determined, for example, using light from an aimer. In one embodiment, a light beam that is substantially coaxial ("on-axis") with the optical axis of the reader in the vision system is used for aiming and also used to measure distance, for example, between the reader and the object (e.g., a surface with a barcode). For example, an on-axis aimer and distance measurement assembly can combine an aimer and a range finder sensor, including a light source, a range finder receiver, and reflective assembly (e.g., a mirror, beam splitter and dichroic filter). In another embodiment, an aimer light beam and a distance measurement beam are projected separately but are both substantially coaxial ("on-axis") with the optical axis of the reader in the vision system. For example, an on-axis aimer and distance measurement system can include an aimer light source, a time of flight system, and two beam splitters.

Advantageously, some embodiments may require only a single distance measurement to provide the correct input to an optics assembly (e.g., a focal system) or other elements of a vision system to control (e.g., adjust) various parameters. Further, in some cases, relevant information for control of system parameters (e.g., focus, gain, aperture settings, etc.) can be obtained using only a single image, rather than multiple images as may be required in conventional systems (e.g., conventional autofocus systems). Indeed, in further contrast to conventional systems, some embodiments may be used to focus a lens of a reader or other vision system without obtaining or analyzing an image. Thus, for example, the process of obtaining a distance measurement may be faster because the distance measurement may not require that an image be taken.

As a further advantage, providing a light beam for aiming and distance measurement on-axis with the reader optical axis can maximize the pointing accuracy of the aiming pattern (or target) guiding the operator. For example, due to misalignment of aiming and image acquisition axes, wide spread of conventional distance measurement systems, or other shortcomings, conventional systems may not reliably measure the distance to a relevant surface or surface area of a target (e.g., where a relevant symbol is located). In contrast use of on-axis light for aiming and distance measurement can help to ensure that any determined distance is appropriately matched with a relevant target region. For example, some embodiments can determine a distance to an object based on reflected light from a projected aiming pattern. This may be particularly useful, for example, for a handheld reader or presentation system (e.g., a fixed read to which objects are presented), in which a user can align a region of interest on an object for imaging using the projected aiming pattern and the vision system can then readily determine a relevant distance to the object at the region of interest, for acquisition of high quality images of the region of interest.

Figure 1:
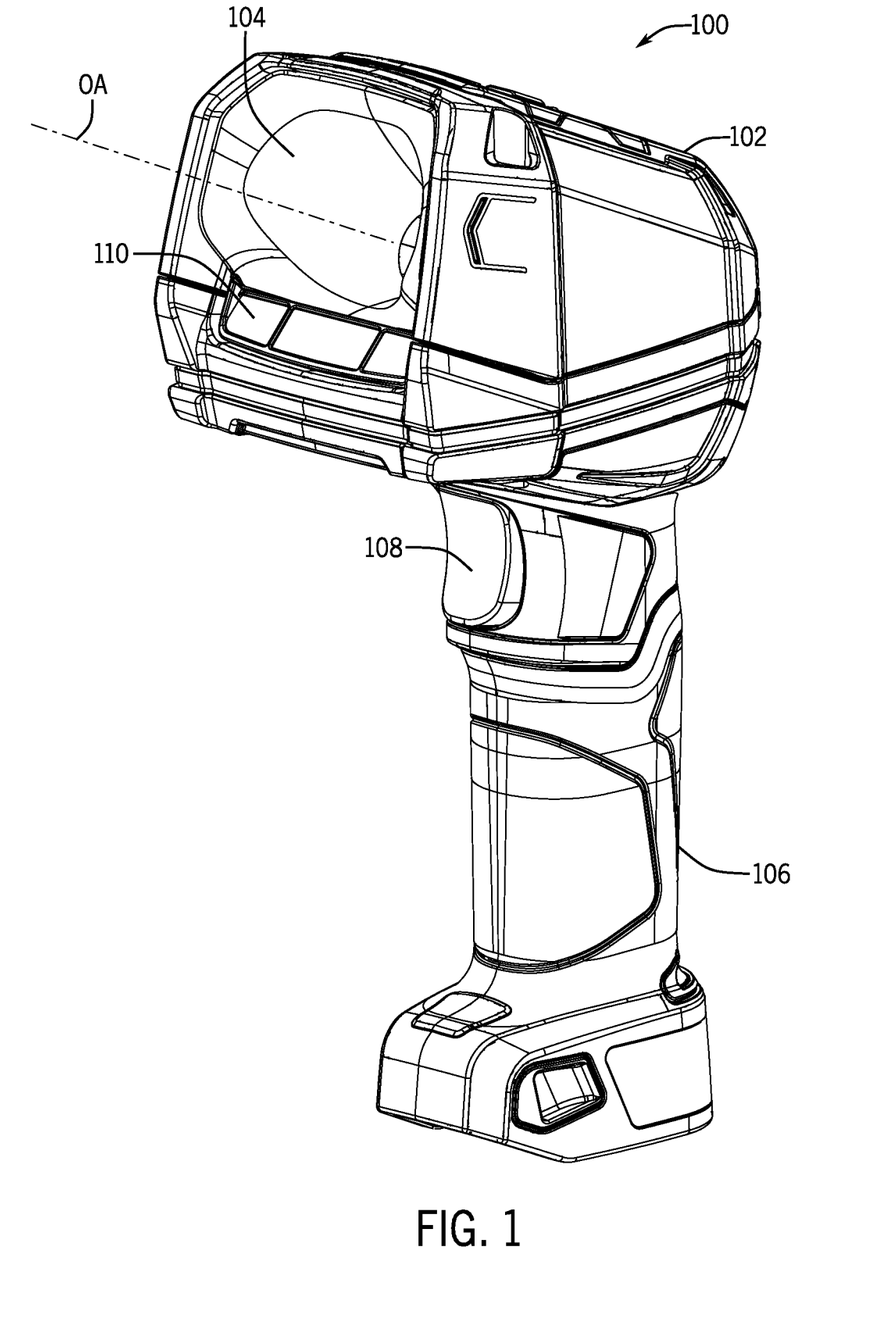
FIG. 1 is an isometric view of a handheld vision system in accordance with an embodiment of the technology.

FIG. 1 is an isometric view of a handheld vision system in accordance with an embodiment of the technology. The shape and arrangement of a vision system is highly variable in alternate embodiments. For example, while FIGS. 1-3B illustrate embodiments of a hand held vision system, it should be understood that the various embodiments described herein may be implemented on different types of vision systems including, but not limited to, other mobile (e.g., other hand held) or fixed mount ID readers.

In general, the vision system 100 includes a reading head 102 with a transparent window 104 through which illumination and aiming and distance measurement light (described below) is projected and light from an imaged scene is received. The reading head 102 incudes vision system optics and an image sensor as well as processing components that perform vision system tasks such as ID code finding and decoding. System 100 may include a base unit or other receiver (not shown) to allow the system to wirelessly transmit (via a wireless link, not shown) decoded data to a data handling device such as an inventory tracking computer or logistics application. Alternatively, the system 100 may be wired to a data handling device/network or can store and subsequently transfer collected information when it is connected to a base unit.

A grip 106, configured as a pistol-style handle, is provided below the reading head 102. The grip 106 enables the user to hold and manipulate the system and to effectively aim the reading head at a subject or target. For example, the grip 106 enables a user to carry the vision system 100 around floor space and aim the device at various objects. The grip 106 includes a trigger 108, which can be employed to acquire images and operate an illumination assembly 110, although some image acquisition and illumination may also (or alternatively) proceed automatically in some cases. The illumination assemble 110 may include one or more light sources, for example, one or more LEDs. With an appropriate arrangement of electrical contacts (not shown—e.g., residing beneath the trigger button) the trigger 108 can be a single-stage trigger in which all functions occur in a sequence once it is pulled, or the trigger can be a two-stage trigger. That is, a partial pressing of it causes the below-described aimer and distance measurement assembly to activate for targeting of a subject, to measure a distance between the reader and the subject, and then, once properly aimed the full pressing of the trigger 108 causes the system 100 to control or set parameters (e.g., the optical poser of a lens (described below) and to acquire an image of the scene. In another embodiment, the aimer and distance measurement assembly may be activated when a user picks up the vision system 100, for example, when the vision system 100 is removed from a charging cradle. In some embodiments, an accelerometer may be used to detect movement of the vision system 100.

Figure 2:
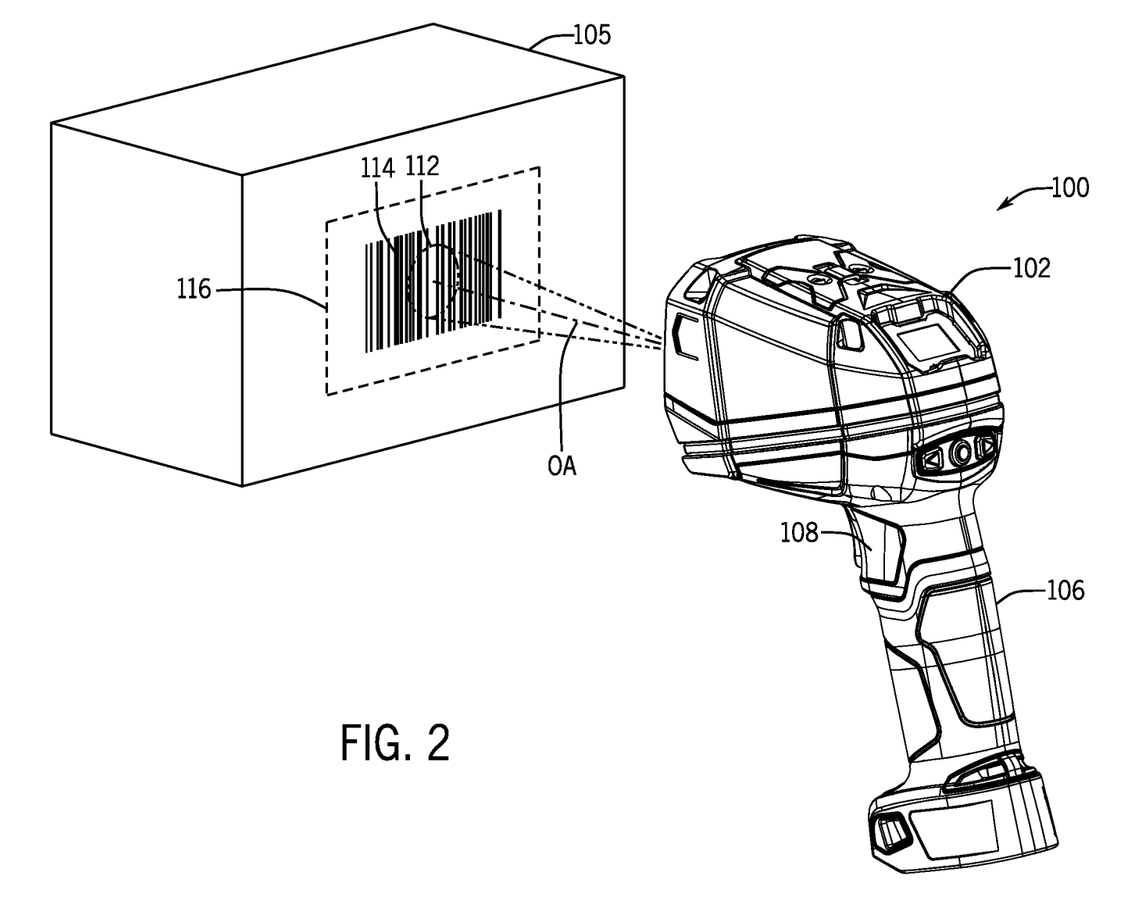
FIG. 2 is an isometric view of the handheld vision system of FIG. 1 performing an ID-reading and decoding task on an object and employing an on-axis aimer and distance measurement assembly in accordance with an embodiment of the technology.

FIG. 2 is a perspective view of the handheld vision system 100 of FIG. 1 performing an ID-reading and decoding task on an object and employing an on-axis aimer and distance measurement assembly in accordance with an embodiment of the technology. As shown in FIG. 2, the system 100 is acquiring an image of an exemplary ID in the form of a barcode 114. The barcode 114 may be located on an object 105 and, in the current orientation, the barcode 114 resides within a field of view 116 of the system 100. This field of view 116 increases with viewing distance. To ensure that the exemplary barcode 114 is properly imaged, as may require the barcode 114 to be properly oriented relative to the system 100 (e.g., centered and fully within the field of view 116), the user directs an aimer pattern onto the barcode 114. This can help to ensure that the barcode 114 resides fully within the field of view 116 for image acquisition.

As described further below, the light beam that is used for the aimer pattern 112 is substantially coaxial (on-axis) with the reader optical axis OA and reflected light from the on-axis aimer pattern 112 may also be used to measure a distance between the reader and the object (e.g., at the barcode 114). The distance may then be used to automatically focus the lens and control other parameters of the vision system 100 as described further below. In the illustrated example, the aimer pattern is shown in the form of a dot 112, although a variety of other projected patterns are possible.

Figures 3A, 3B:
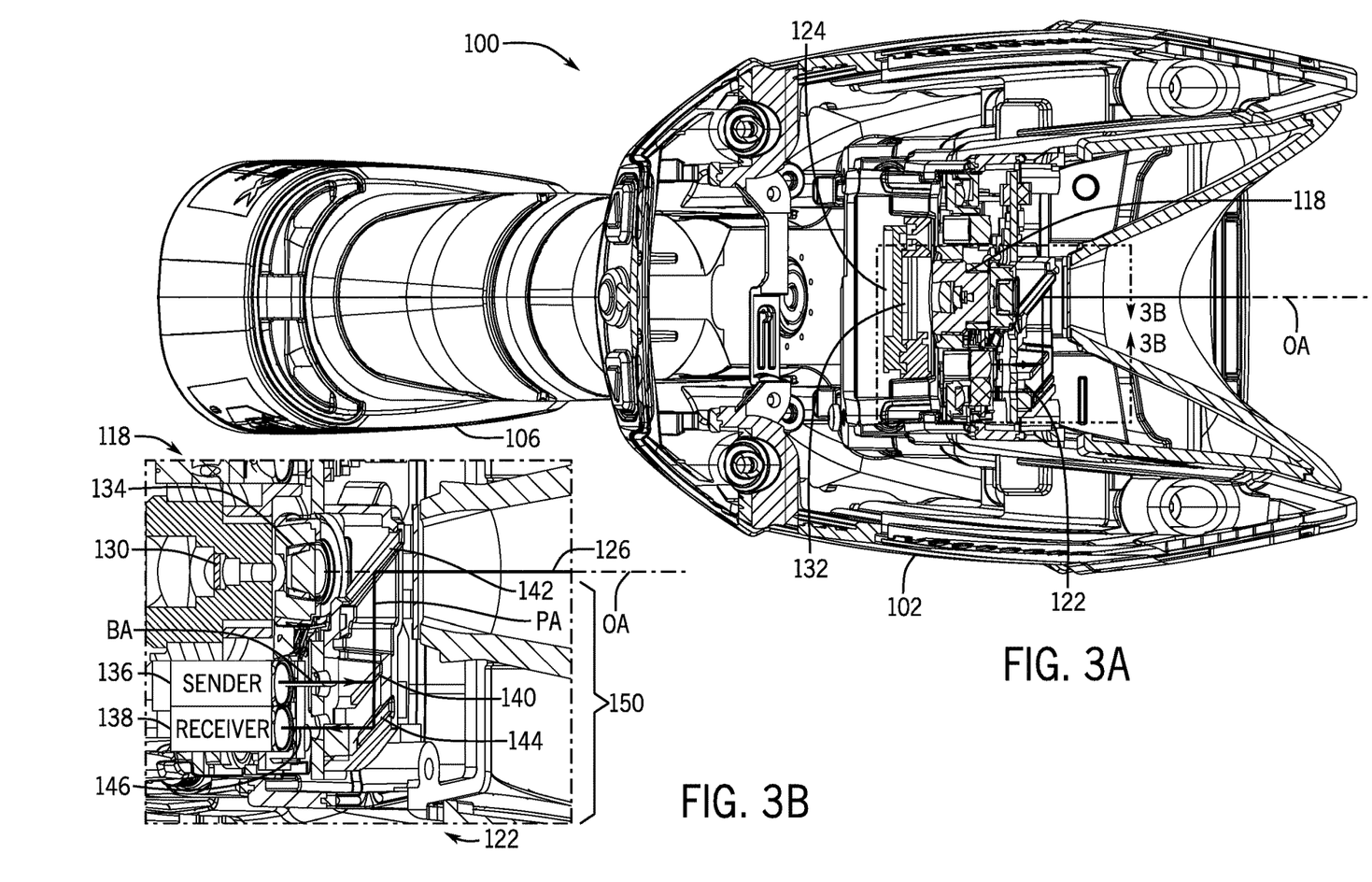
FIG. 3A is a cross-sectional top plan view of the vision system of FIG. 1, showing certain internal structures of the vision system in accordance with an embodiment of the technology.
FIG. 3B is a cross-sectional side partial view the vision system of FIG. 1, including an image sensor, the optics assembly and the on-axis aimer and distance measurement assembly of the vision system of FIG. 1 in accordance with an embodiment of the technology.

FIG. 3A is a cross-sectional top plan view of the internal structure of the vision system 100 of FIG. 1 in accordance with an embodiment of the technology and FIG. 3B is a cross-sectional side partial view of the vision system 100, including an image sensor, the optics assembly and an on-axis aimer and distance measurement assembly 122 in accordance with an embodiment of the technology. It should be noted that the depicted arrangement of components is illustrative of a wide range of layouts and component types. This illustration is, thus, provided to teach a possible arrangement of components that provide the functions of the illustrative embodiment, although other embodiments can exhibit other configurations.

In the embodiment shown, the interior of the reading head 102 includes an image sensor 132 and an associated vision system processor assembly 124 that can be provided on one or more circuit boards (and operatively interconnected by the appropriate ribbon cable(s) or other communication channels (not shown)). The processor assembly 124 controls vision system analysis processes (e.g., ID reading and decoding) as well as other functions, such as projection of an aimer beam, illumination for image acquisition, distance measurement, automatic focus adjustment, etc. The processor 124 may be mounted to a heat sink that extends both forward and rearward in the head 102.

In front of the sensor 132 is placed an optics assembly 118 having a series of lenses that project the images light onto the area of the sensor 132. In the illustrated embodiment, the optics assembly 118 includes a lens arrangement 130 with a liquid lens 134, and the focal distance and optical power of the system may be accordingly adjusted by varying a voltage applied to the liquid lens. In other embodiments, the optics assembly 118 can include a lens assembly with mechanical parts (e.g., gear, motor and a thread assembly) that are used to move a lens toward or away from the sensor 132 to change the focal distance of the system.

As generally discussed above, the vision system 100 also includes an on-axis aimer and distance measurement assembly 122, which can be used to provide aiming illumination and also to determine distance to an object based on the aiming illumination. In particular, the on-axis aimer and distance measurement assembly 122 includes a light source 136, a receiver 138 and a reflecting assembly 150 that is positioned in front of the optics assembly 118. Although a variety of configurations are possible, in the illustrated embodiment the reflecting assembly 150 includes a first element configured as a beam splitter 140, a second element configured as a dichroic filter 142 and a third element configured as a mirror 144. The beam splitter 140 and the dichroic filter 142 direct light from the light source 136 from a beam path/axis BA that is parallel to the reader optical axis OA to a path coaxial with the reader optical axis OA. Thus, the light source 136 can be located out of the way of the lens arrangement 130, but illumination from the light source 136 can still be coaxial with image acquisition.

In an embodiment, the aimer light source 136 includes an LED or laser diode. Further, the light emitted by the light source 136 can define a wavelength (or range of wavelengths) distinct from the light provided by the illumination assembly 110 (shown in FIG. 1). For example, the light source 136 can project in the green or blue wavelength range as may be conducive for user engagement for aiming, while the illumination assembly 110 can project in a red wavelength range as may be conducive for high quality image acquisition. In an embodiment, the light source 136 includes a lens (not shown) of appropriate shape and characteristics to collimate the light from the light source 136 into a beam along axis BA.

As alluded to above, the light beam projected by light source 136 is configured to be used as both an aimer beam and to determine the distance between the lens 130 and the object or target. As discussed further below, the determined distance may be used to control or set various parameters of the vision system 100 including to set a proper optical power of the liquid lens 134.

In this regard, light from light source 136 that is reflected from the subject back to the vision system 100 along the path coaxial with the optical axis OA is directed by the dichroic filter 142 and the mirror 144, after passing through the beam splitter 140, to a return path 146 that is parallel to the optical axis OA and the beam path/axis BA. The reflected light along path 146 is received by the receiver 138 for processing (e.g., by processor 124) to determine a distance between the lens 130 and the object. This arrangement may also correspond to further advantages to the use of different wavelengths of light for image acquisition as compared to aiming and distance measurement. For example, the dichroic filter 142 can thus readily divert reflected light from the light source 136 to the return path 146 but can largely pass light from the illumination assembly 110 to pass through the lens arrangement 130.

Although the illustrated arrangement of the reflecting assembly 150 can be advantageous, including for reasons discussed above, other configurations are also possible. For example, different types or arrangements of beam splitters, mirrors, filters, or other devices can be used to similarly ensure that certain light (e.g., from an aimer) can be used for distance measurement and certain light (e.g., from another illumination assembly) can be used for image acquisition.

In one embodiment, the light source 136 and receiver 138 are configured to operate as a laser range finder according to generally known approaches to processing optical signals. In another embodiment, the receiver 138 is configured to operate as a Time of Flight (ToF) sensor, again according to generally known approaches to processing optical signals.

In different embodiments, different components of a reflecting assembly can be arranged in different ways, depending on the particular components used, the relative orientations of different light sources and sensors, the orientation of an imaging axis, and so on. In the illustrated embodiment, for example, the beam splitter 140 is located in front to the light source 136 and oriented at an angle of 45 degrees with respect to the axis BA. The beam splitter 140 thus reflects the light beam from light source 136 by an angle of 90 degrees to an orthogonal (perpendicular) path PA. The light beam is then reflected by the dichroic filter 142, which is resides within and is oriented at an angle of 45 degrees with respect to the reader optical axis OA. This arrangement causes the light beam 126 to become coaxial with the reader optical axis OA to be projected onto the target and thereby assist a user in aiming the vision system 100 for image acquisition. Further, the dichroic filter 142 is configured to reflect the light from light source 136 and the light from this beam as reflected by the object and to transmit the light from the illumination assembly 110 (see FIG. 1). In particular, the dichroic filter 142 reflects the light from beam 126 that is reflected by the object by an angle of 90 degrees, back to the orthogonal (perpendicular) path PA. The beam splitter 140 then transmits the reflected light to the mirror 144. As also generally discussed above, the mirror 144 is located in front of the receiver 138 and oriented at an angle of 45 degrees with respect to the axis PA. The mirror 144 thus reflects the return light beam by an angle of 90 degrees to an orthogonal (perpendicular) path 146 and causes the return light beam to become parallel with the reader optical axis OA and the axis BA.

Although the relevant components of the reflecting assembly 150 (e.g., the beam splitter 140, the dichroic filter 142, and the mirror 144) are each oriented at the depicted 45 degree angle as shown and described, the relative angle of the mirrors used to align the beams with respect to the reader optical axis can be varied in accordance with conventional optical design, based on the relative orientation of other relevant components. The width and height of at least the dichroic filter 142 is typically large enough to cover the entire field of view. In this manner, the acquired image is not interrupted by the filter's edges. In an embodiment, the beam splitter 140 is at least large enough in area to cover the collimated beam.

With respect to the characteristics of the dichroic filter 142, dichroic glass (or polymer) can include material containing multiple micro-layers of metals or oxides which give the material dichroic optical properties. A primary characteristic of a dichroic filter is that it can define a specific transmitted color and a different reflected color, as certain wavelengths of light either pass through or are reflected. Thus, as also discussed above, because the light beam from light source 136 is one wavelength (e.g., green) and the scene is illuminated by a distinct, differing wavelength (e.g., red), the dichroic filter 144 can be coated so that illumination light from the imaged scene passes through the filter 144 towards the sensor 132, while the aimer/distance measurement light beam (either projected to the imaged scene or reflected by the images scene) is reflected by the coating.

Figure 4:
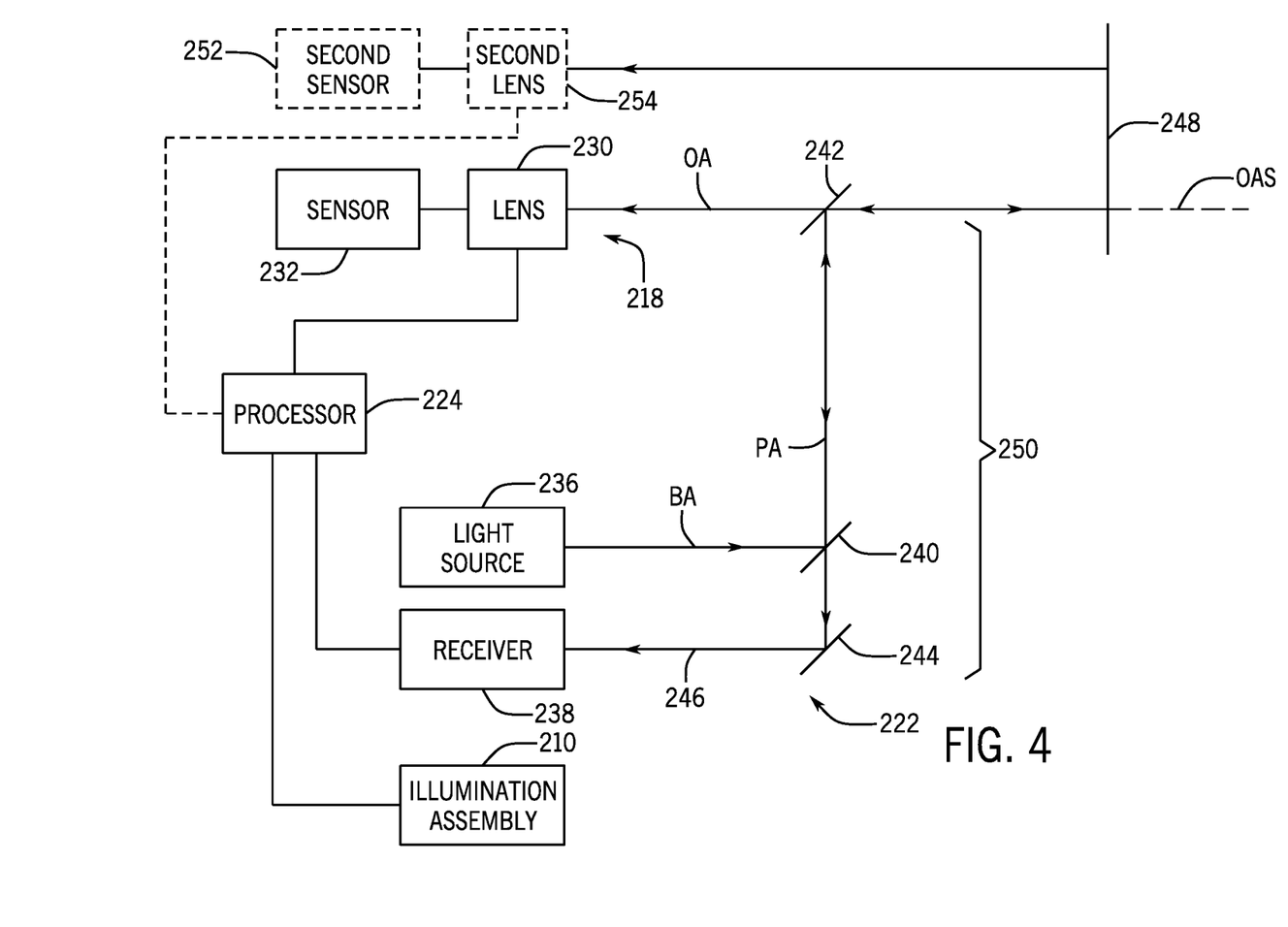
FIG. 4 is a schematic diagram of the optics assembly and on-axis aimer and distance measurement assembly in accordance with an embodiment of the technology.

Although the configuration illustrated in FIGS. 1-3 may be particularly useful in some applications, other configurations are possible. In this regard, for example, FIG. 4 is a schematic diagram of an optics assembly and on-axis aimer and distance measurement assembly in accordance with an embodiment of the technology. In general, an on-axis aimer and distance measurement assembly 222 may be used to determine the distance of an object from a lens 230 and to control or set various parameters of the vision system based on the distance measurement. For example, based on a determined distance, the assembly 222 may be configured to determine and implement a correct focus value, illumination level, magnification, position of a reader (e.g., for object tracking), and so on. Accordingly, the distance measurement may be used in various applications such as, for example, auto-focus, tracing targets based on distance and three-dimensional (3D) measurements.

In operation, the on-axis aimer and distance measurement assembly 222 is activated to project a light beam from a light source 236 that provides an aiming pattern on an object or other target and is used to measure the distance between lens 230 in the optical assembly 218 and the object or other target. The on-axis aimer and distance measurement assembly 222 may be activated, for example, as soon as the relevant vision system is picked up (e.g., using an accelerometer), when a trigger (not shown) is pressed on the visions system, or based on some other event (e.g., an object being presented to or passing a light curtain relative to a fixed-location reader). As shown, the light beam from light source 236 is projected along a path BA which is parallel to a reader optical axis OA. A beam splitter 240 and a dichroic filter 242 of the reflective assembly are used to direct the light beam from the beam path/axis BA to a path coaxial with the reader optical axis OA as similarly described above.

The light beam is reflected from the object or other target and the dichroic filter 242 and a mirror 244 of the reflective assembly direct the reflected light from the path coaxial with the optical axis OA to a return path 246 (e.g., in parallel with the optical axis OA). The reflected aiming light directed along path 246 is received by the receiver 238 for processing (e.g., by processor 224) to determine a distance between the lens 230 and the object. Known methods in the art for processing of optical signals may be used for determining the distance based on the reflected aiming light. For example, in one embodiment, the receiver 238 forms part of a time of flight system.

Once determined, the measured distance may then be used by the processor 224 to control or set various parameters of the visions system. In this regard, for example, processer 224 may be in communication with the optics assembly 218 (e.g., lens 230), the receiver 228 and the illumination assembly 210, as well as a variety of other components (not shown), such as motors for adjustment of system orientation or aperture settings, or a variety of other actuators. In one embodiment, the measured distance may be used to determine the proper optical power to obtain a sharp image. For example, the measured distance may be translated to an optical power (diopters) for the lens 230 based on a known relationship between measured distance and optical power. The processor 224 may then automatically focus the lens 230 to achieve the optical power calculated based on the measured distance.

In an embodiment, the measured distance may be used to improve 3D measurements, such as may be implemented using a second imaging device with a second lens 254 and a second image sensor 252. For example, as also generally discussed below, the sensors 232, 252 may be oriented at an oblique angle relative to each other, so that the sensors 232, 252 acquire images of a common scene from different respective perspectives. With appropriate determination of a distance to an object in the images, such as provided using the on-axis aimer and distance measurement assembly 222, a 3D representation of the object can then be determined. Although the illustrated arrangement may be useful for some implementations of 3D measurement, other configurations, including those employing differently configured sensors, lenses, and on-axis aimer and distance measurement assemblies are also possible.

In an embodiment, the measured distance may be used to control tracking of object movement, including based on multiple successive distance measurements, to control aperture settings, or to adjust other system parameters such as illumination intensity, exposure time, and gain (e.g., to compensate for larger or smaller distances to a target). For example, as also generally discussed below, multiple distance measurements of an object can be analyzed to determine a path and rate of travel of the object, and a vision system can be controlled accordingly to acquire images of the moving object.

In an embodiment, once the distance has been determined, the light beam from the light source 236 may be turned off, at least for long enough for an image of the scene to be captured. In this regard, illumination light 248 that is reflected from the scene along an optical axis OAS is transmitted through the dichroic filter 242 along the reader optical axis OA and through lens 230 to the image sensor 232. Known methods may be used for generating an image of the scene and decoding data therein.

In an embodiment, the measured distance may be used to select and adjust aspects of illumination and magnification for image acquisition, including the illumination intensity, exposure time, aperture settings, and gain. For example, more intensive illumination, lower f-stop settings (and correspondingly adjusted exposure times), a particular one of several fixed aperture sizes, more substantial zoom, or other similar factors may be implemented when the measured distance is relatively large, whereas less intensive illumination, larger f-stop settings (and correspondingly adjusted exposure times), a different one of several fixed aperture sizes, less substantial zoom, or other similar factors may be implemented when the measured distance is relatively small.

In an embodiment, one or more dimensions of an object or a feature on the object (e.g., a symbol) may be determined based on measured distance and the acquired image data. For example, the size of a barcode may sometimes be calculated based on a determined distance to the barcode, the pixel size of the barcode in an acquired image, and a calibration between pixel and real-world size for the relevant image sensor. This size information can then be used for improved subsequent image acquisition, improved analysis of the barcode (e.g., for decoding or verification) or other processes.

In another embodiment, target tracking may be performed based on the measured distance. For example, a reader configured with a two-axis actuator system can have the ability to follow a moving target, thereby effectively increasing the field of view (FOV) for imaging the target as compared to a fixed system. In some cases, based on multiple successive distance measurements for an object, a vision system (e.g., one of the systems 100, 200 discussed above) can determine a path of travel for the object and an associated actuator system can be controlled accordingly to maintain appropriate alignment of the vision system for image acquisition of the object. Further, successive distance measurements can also be used to adjust focus as an object moves, alone or in combination with movement of the vision system as a whole to track the object. For example, as an object moves relative to a vision system, a focus setting of the vision system (and other parameters, as relevant) can be continually adjusted to ensure appropriate quality of images of the object. In an embodiment, the orientation of a reader can be adjusted to provide a substantially extended viewing window for a particular object. For example, as a moving object first enters a FOV of a reader, a distance to the object can be measured (e.g., as described above) and appropriate parameters controlled accordingly to acquire an image of the object. As the object continues to move through the FOV, updated distance measurements can be used to ensure that focus settings (and other parameters) are appropriately updated and, as needed, to adjust the orientation of the reader to track the movement of the object.

In another embodiment, the measured distance may be used to perform three-dimensional measurements. For example, a dual reader with two imaging systems that have at least one on-axis aimer and distance measurement apparatus may provide 3D information using the photogrammetry principle. In this regard, the use of the on-axis aimer and distance measurement apparatus can help to overcome the challenge in some conventional approaches, in which the distance to the target is not appropriately known. Additionally, because some embodiments can measure distance along the optical axis (e.g., using variations on the system 100, 200), the measured distance may be particularly accurate for 3D calculations. And the accurate focus settings (and other parameters) that can be obtained (e.g., as described above) can further improve 3D measurements by ensuring suitable sharpness of relevant images.

In some dual reader embodiments, only a single distance may be measured, such as a distance relative to a particular one of the two imaging sensors or lens arrangements or a distance relative to another known reference point. However, other relevant distances, such as to the other of the two imaging sensors, can then be readily determined based on the known relative locations of the two readers or other relevant components. Once the relevant distances have been determined, a triangulation calculation can then be used for sets of images acquired by the two readers to determine 3D measurements for an object in the images.

Figure 5:
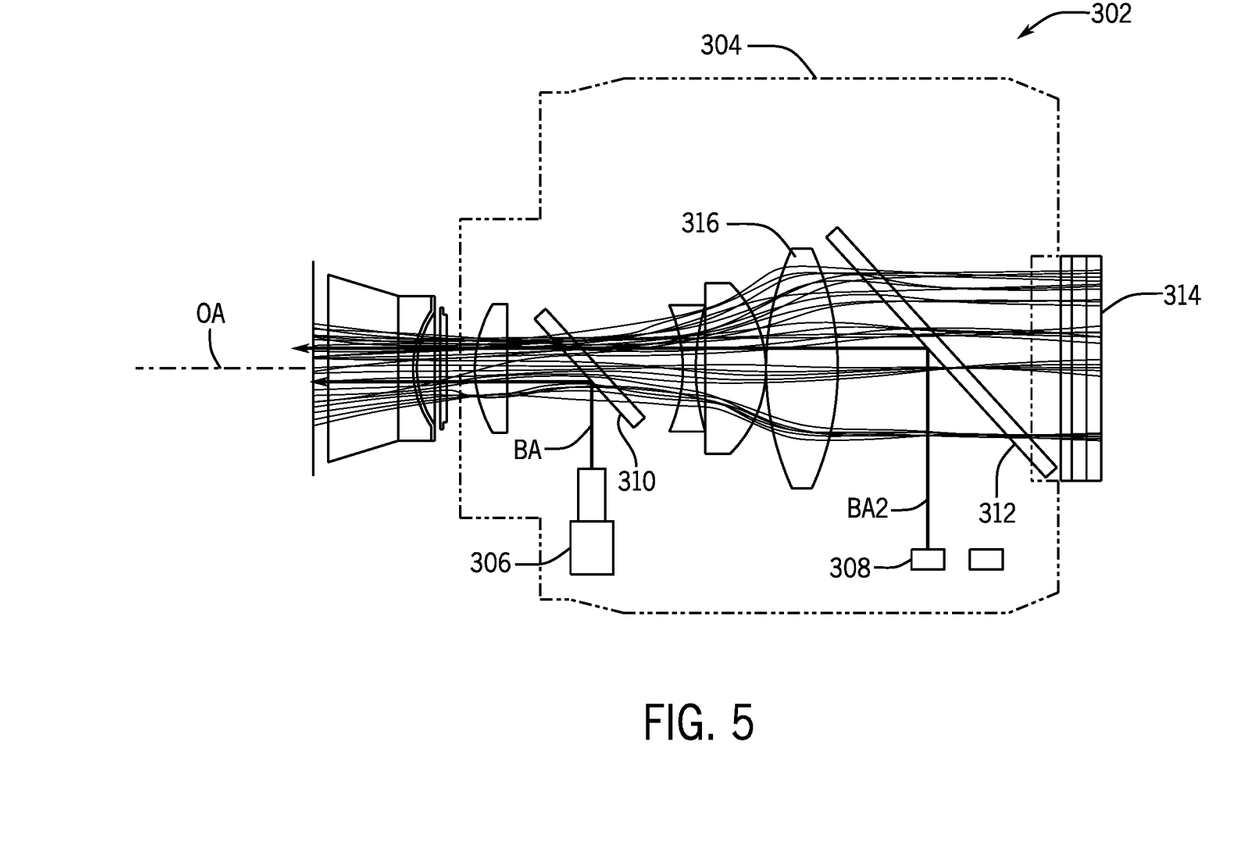
FIG. 5 is a schematic diagram of an optics assembly, an on-axis aimer, and an on-axis distance measurement assembly in accordance with an embodiment of the technology.

Although use of an aimer in combination with a distance measurement may be particularly efficient and advantageous in some embodiments, including for reasons discussed above, other configurations are also possible. For example, FIG. 5 is a schematic diagram of the optics assembly 302 that includes an on-axis aimer system 306, and an on-axis distance measurement assembly 308 in accordance with an embodiment of the technology. In FIG. 5, the on-axis aimer system 306 and the distance measurement assembly 308 (e.g., a ToF system) is positioned within a barrel 304 of the optic assembly 302, which can be disposed in alignment with an image sensor 314 (e.g., as part of a removable assembly that can be selectively attached to or detached from a larger vision system). In this embodiment, the on-axis aimer system 306 is separate from the measurement system 308, although both are positioned in the barrel 204 in alignment with the image sensor 314, a lens arrangement 316 and other optics.

In particular, a reflecting assembly includes a first beam splitter 310 and a second beam splitter 312. The on-axis aimer system 310 projects an aimer light beam along a path/axis BA that is perpendicular to the reader optical axis OA. The first beam splitter 310 is used to direct the aimer light beam from the beam path BA to a path coaxial with the reader optical axis OA. The first beam splitter 310 is located between lenses of the lens arrangement 316 and oriented at an angle of 45 degrees with respect to the axis BA. The on-axis ToF system 308 projects a distance light beam along a path/axis BA2 that is perpendicular to the reader optical axis OA. The second beam splitter 312 is used to direct the distance light beam from the beam path BA2 to a path coaxial with the reader optical axis OA. The second beam splitter 310 is located upstream from the lens 316 and oriented at an angle of 45 degrees with respect to the axis BA2. Accordingly, both the aimer light beam and the distance light beam are on substantially coaxial with the optical axis OA and operations for aiming, distance measurement, and system control based on distance measurements can be implemented as similarly discussed above, albeit without necessarily using light for aiming to also determine object distance.

Figure 6:
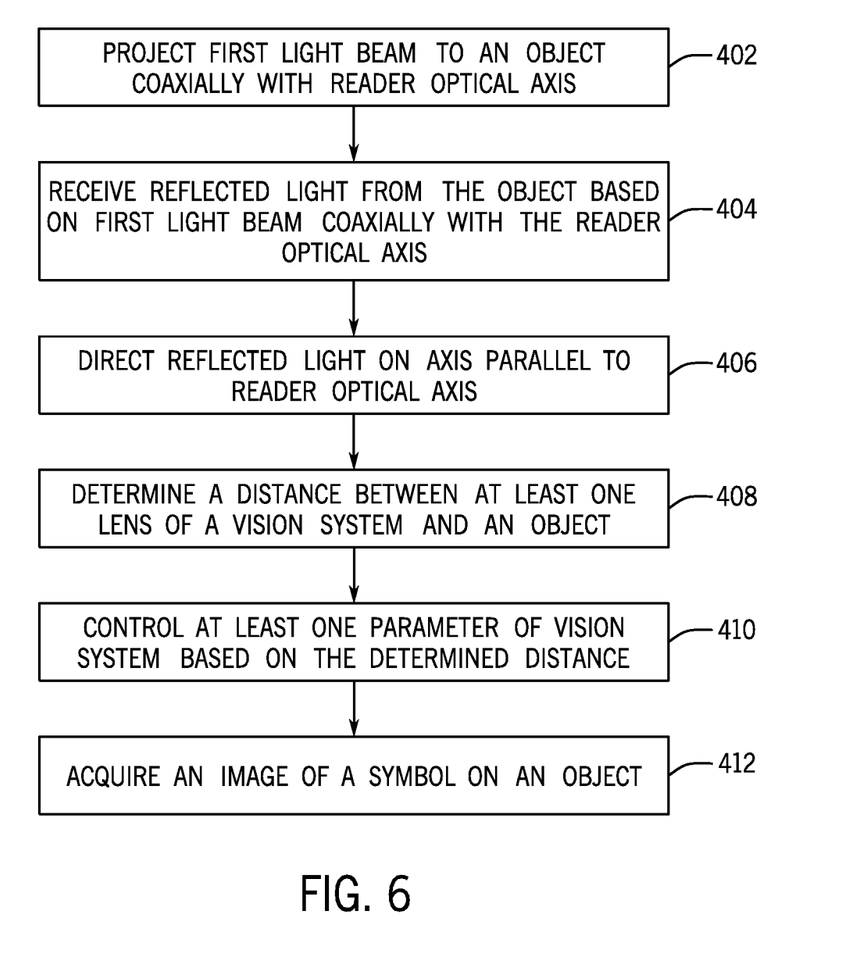
FIG. 6 illustrates a method for acquiring an image of a symbol on an object using a vision system employing an on-axis aimer and distance measurement assembly in accordance with an embodiment of the technology.

FIG. 6 illustrates a method for acquiring an image of a symbol on an object using a vision system employing an on-axis aimer and distance measurement assembly in accordance with an embodiment of the technology. At block 402, a first light beam is projected to an object coaxially with a reader optical axis. As discussed above with respect to FIGS. 1-5, a reflecting assembly of an on-axis aimer and distance measurement assembly for a vision system may be used to project the light beam coaxially with the reader optical axis. In some embodiments, the first light beam is used for aiming and also used to measure distance. At block 404, reflected light is received by the vision system from the object based on the first light beam. When received by the vision system, the reflected light can be coaxial with the reader optical axis, as also discussed above. At block 406, the reflected light is directed to an axis parallel to the reader optical axis. As described above, the reflecting assembly of the on-axis aimer and distance measurement assembly is used to direct the reflected light to the axis parallel with the reader optical axis. At block 408, a distance between the least one lens of the vision system and the object is determined based on the reflected, directed light from the first light beam. As discussed above, one or more processor devices may be used to determine the distance using known methods in the art for processing optical signals. For example, in some embodiments, the on-axis aimer and distance measurement assembly may include a time of flight system.

At block 410, at least one parameter of the vision system is controlled, for example, using the one or more processor devices, based on the distance determined at block 408. For example, the processor device(s) may be used to control vision system parameters such as focus, gain, aperture setting, exposure time, illumination intensity, magnification, position of a reader, and so on. Accordingly, the determined distance may be used in various application such as, for example, auto-focus, tracking targets based on distance, and 3D measurements. At block 412, the vision system can be used to acquire an image of a symbol on an object. As described above, an image may be acquired by projecting an illumination light on the object; and receiving reflected illumination light from the object. In some embodiments, the first light beam has a first wavelength (e.g., green or blue light) and the illumination light has a second wavelength (e.g., red light). In an embodiment, once the distance has been determined, the first light beam may be turned off, at least for long enough for an image to be acquired. Known methods may be used for generating an image of the symbol and decoding data therein.

Figure 7:
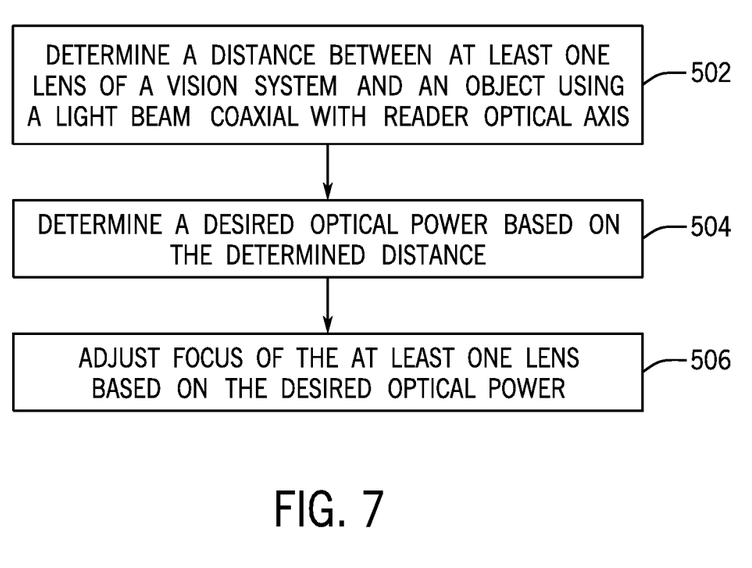
FIG. 7 illustrates a method for automatically focusing at least one lens of a vision system using an on-axis aimer and distance measurement assembly in accordance with an embodiment of the technology.

As mentioned, in some implementations, the distance determined at block 408 may be used to automatically focus one or more lenses in a vision system. FIG. 7 illustrates a method for automatically focusing at least one lens of a vision system using an on-axis aimer and distance measurement assembly in accordance with an embodiment of the technology. At block 502, a distance between at least one lens of a vision system and an object is determined using a light beam coaxial with a reader optical axis as described above with respect to blocks 402 to 408 of FIG. 6. At block 504, a desired optical power for one or more lenses in the vision system is determined based on the determined distance. As discussed above, one or more processor devices may be used to determine the desired optical power using known methods in the art. In some embodiments, the desired optical power is the proper optical power to obtain a sharp image. At block 506, a focus of the at least one lens is adjusted, for example, using the one or more processor devices, based on the desired optical power.

Figure 8:
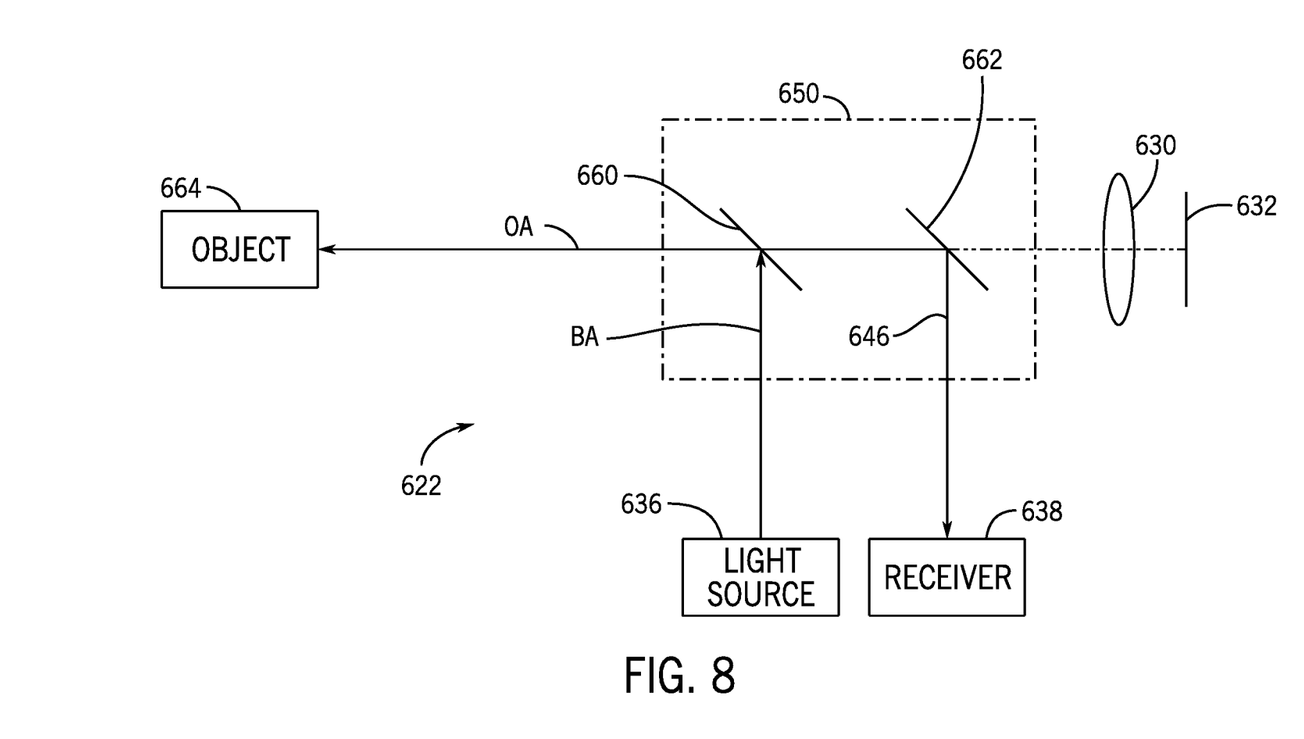
FIG. 8 is a schematic diagram of the optics assembly and on-axis aimer and distance measurement assembly in accordance with an embodiment of the technology.

Although the configuration of the reflecting assembly 150, 250 illustrated in FIGS. 3A, 3B and 4 may be particularly useful in some applications, other configurations are possible. In this regard, for example, FIG. 8 is a schematic diagram of the optics assembly and on-axis aimer and distance measurement assembly in accordance with an embodiment of the technology. As mentioned above with respect to FIG. 4, an on-axis aimer and distance measurement assembly 622 may be used to determine the distance of an object from a lens 630 and to control or set various parameters of the vision system based on the distance measurement. In operation, the on-axis aimer and distance measurement assembly 622 is activated to project a light beam from a light source 636 that provides an aiming pattern on an object or other target 664 and is used to measure the distance between lens 630 in an optical assembly and the object or other target 664. The on-axis aimer and distance measurement assembly 622 may be activated, for example, as soon as the relevant vision system is picked up (e.g., using an accelerometer), when a trigger (not shown) is pressed on the visions system, or based on some other event (e.g., an object being presented to or passing a light curtain relative to a fixed-location reader). As shown, the light beam from light source 636 is projected along a path BA which is perpendicular to a reader optical axis OA. A beam splitter 660 of a reflective assembly 650 is used to direct the light beam from the beam path/axis BA to a path coaxial with the reader optical axis OA.

The light beam is reflected from the object or other target 664 and the beam splitter 660 and a dichroic filter 662 of the reflecting assembly 650 direct the reflected light from the path coaxial with the optical axis OA to a return path 646 (e.g., perpendicular to the optical axis OA). The reflected aiming light directed along path 646 is received by the receiver 638 for processing (e.g., by a processor (not shown)) to determine a distance between the lens 630 and the object. Known methods in the art for processing of optical signals may be used for determining the distance based on the reflected aiming light. For example, in one embodiment, the receiver 638 forms part of a time of flight system. Once determined, the measured distance may then be used (e.g., by a processor) to control or set various parameters of the vision system as similarly described above with respect to FIGS. 3A-4.

Figure 9:
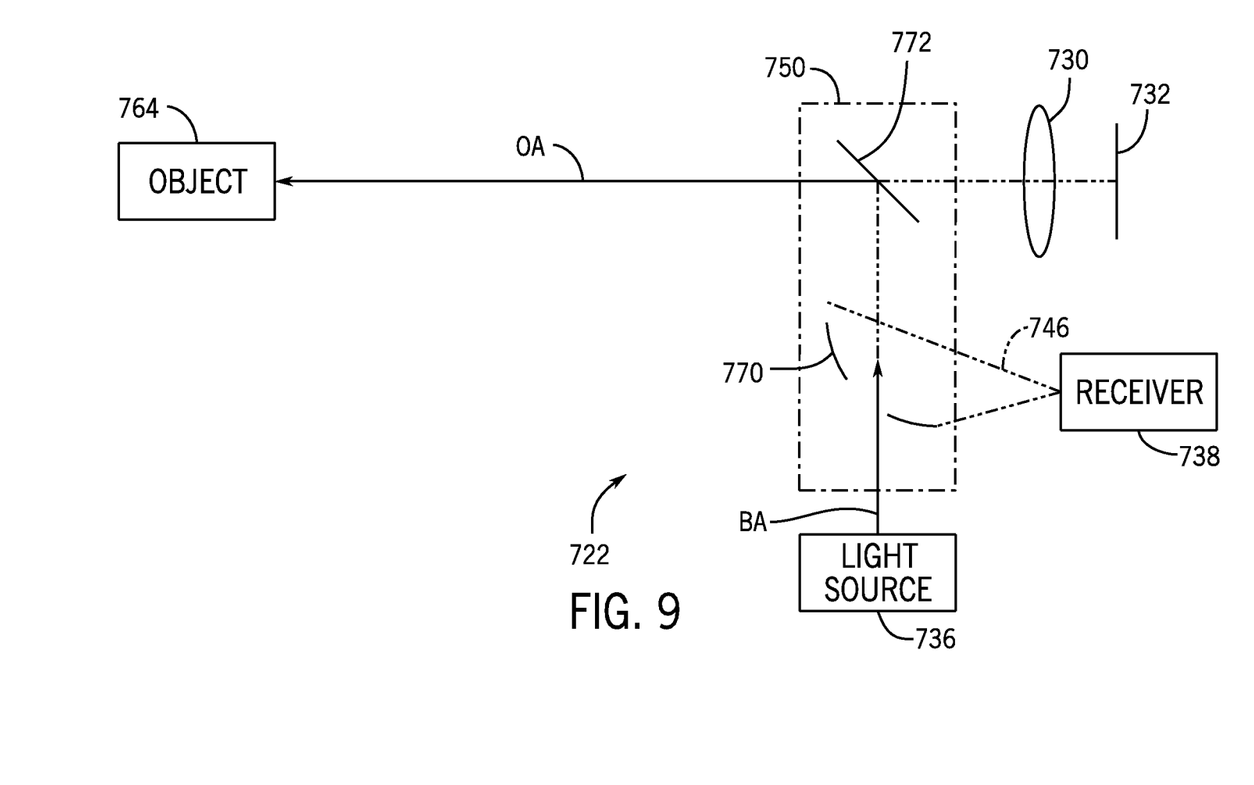
FIG. 9 is a schematic diagram of the optics assembly and on-axis aimer and distance measurement assembly in accordance with an embodiment of the technology.

In another example of an alternative reflecting assembly arrangement, FIG. 9 is a schematic diagram of the optics assembly and on-axis aimer and distance measurement assembly in accordance with an embodiment of the technology. As mentioned above, an on-axis aimer and distance measurement assembly 722 may be used to determine the distance of an object from a lens 730 and to control or set various parameters of the vision system based on the distance measurement. In operation, the on-axis aimer and distance measurement assembly 722 is activated to project a light beam from a light source 636 that provides an aiming pattern on an object or other target 764 and is used to measure the distance between lens 730 in an optical assembly and the object or other target 764. The on-axis aimer and distance measurement assembly 722 may be activated, for example, as soon as the relevant vision system is picked up (e.g., using an accelerometer), when a trigger (not shown) is pressed on the visions system, or based on some other event (e.g., an object being presented to or passing a light curtain relative to a fixed-location reader). As shown, the light beam from light source 736 is projected along a path BA which is perpendicular to a reader optical axis OA. The light beam passes through a mirror 770 of a reflecting assembly 750. For example, mirror 770 may include a hole in the center through which the light beam from the light source 736 can pass. The mirror 770 may be, for example, a flat or concave mirror. A dichroic filter 772 of the reflective assembly 750 is used to direct the light beam from the beam path/axis BA to a path coaxial with the reader optical axis OA.

The light beam is reflected from the object or other target 764 and the dichroic filter 662 and the mirror 770 of the reflecting assembly 750 directs the reflected light from the path coaxial with the optical axis OA to a return path 746 (e.g., in parallel to the optical axis OA). The reflected aiming light directed along path 746 is received by the receiver 738 for processing (e.g., by a processor (not shown)) to determine a distance between the lens 730 and the object. Known methods in the art for processing of optical signals may be used for determining the distance based on the reflected aiming light. For example, in one embodiment, the receiver 738 forms part of a time of flight system. Once determined, the measured distance may then be used (e.g., by a processor) to control or set various parameters of the vision system as similarly described above with respect to FIGS. 3A-4.

In some cases, use of a combination parallel and perpendicular axes for on-axis implementation of one or more of image acquisition, illumination, aiming, and distance measurement, including as illustrated in FIGS. 3b, 4, 5, 8 and 9, may be particularly advantageous. For example, arrangement of reflective members such as beam splitters, dichroic filters, standard mirrors, and so on to provide right-angle changes in the direction of projected or reflected light may be relatively easy to implement. Further, the form factor of relevant components, such as lens arrangements, illumination devices, distance measurement devices, and so on, may be particularly conducive to projection and receipt of light in parallel directions. In some embodiments, however, it may be possible to implement on-axis principles as discussed above with different angles of reflection for light, such as in cases in which an illumination device is configured to project light with an initial direction that is not in parallel with a main optical axis of an imaging device, or in which a measurement device is configured to receive light in a similarly non-parallel direction.

The foregoing has been a detailed description of illustrative embodiments of the technology. Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present disclosure, what has been described herein is merely illustrative of the application of the principles of the present disclosure. Also, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Accordingly, the description is meant to be taken only by way of example, and not to otherwise limit the scope of this disclosure.

In some embodiments, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the technology can be implemented as a set of instructions, tangibly embodied on a non-transitory computer-readable media, such that a processor device can implement the instructions based upon reading the instructions from the computer-readable media. Some embodiments of the technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the technology. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The invention claimed is:

1. An apparatus for automatically focusing a reader having an optical axis in a vision system, the apparatus comprising:
   an optics assembly having at least one lens and an image sensor;
   an on-axis aimer and distance measurement assembly comprising:
      a light source configured to generate a first light beam along a first axis, the first light beam configured to project an aimer pattern on an object;
      a receiver configured to receive reflected light from the object based on the first light beam, the reflected light provided to the receiver along a second axis;
      a reflecting assembly configured to direct the first light beam received from the light source so that the first light beam is projected onto the object coaxially with the reader optical axis and configured to direct the reflected light from the optical axis to the second axis; and
   a processor device in communication with the receiver and the optics assembly and configured to determine a distance between the at least one lens and the object based on the reflected light and to focus the at least one lens based on the determined distance;
   wherein the reflecting assembly comprises at least two elements and at least one of the at least two elements is positioned in front of the at least one lens and wherein at least one of the at least two elements directs the first light beam received from the light source so that the first light beam is projected onto the object coaxially with the reader optical axis and at least one of the at least two elements receives the reflected light along the optical axis and directs the reflected light from the optical axis to the second axis.

2. The apparatus according to claim 1, wherein at least one of the at least two elements is a beam splitter.

3. The apparatus according to claim 1, wherein at least one of the at least two elements is a dichroic filter.

4. The apparatus according to claim 1, wherein the at least one lens is a liquid lens.

5. The apparatus according to claim 1, wherein the light source and the receiver form part of a laser range finder system.

6. The apparatus according to claim 1, wherein the first light beam has a first wavelength in the visible spectrum to provide an aiming pattern on the object.

7. The apparatus according to claim 6, wherein the apparatus is further configured to provide illumination light with a second wavelength that is different from the first wavelength and at least one of the at least two elements is configured to transmit the illumination light to the at least one lens along the reader optical axis for image acquisition at the image sensor.

8. An on-axis aimer and distance measurement apparatus for a vision system comprising:
   a light source configured to generate a first light beam along a first axis, the first light beam configured to project an aimer pattern on an object;
   a reflecting assembly configured to direct the first light beam received from the light source to be projected onto the object along a second axis and configured to receive reflected light from the first light beam on the object along the second axis, and to direct the reflected light from the second axis to a third axis;
   a receiver configured to receive the reflected light along the third axis to determine a distance between a lens of the vision system and the object; and
   a processor device configured to control one or more parameters of the vision system for acquisition of an image of the object based on the determined distance;
   wherein the reflecting assembly comprises at least two elements and wherein at least one of the at least two elements directs the first light beam received from the light source so that the first light beam is projected onto the object along the second axis coaxially with a reader optical axis and at least one of the at least two elements receives the reflected light along the second axis and directs the reflected light from the second axis to the third axis.

9. The apparatus according to claim 8, wherein the reflecting assembly comprises a mirror, a beam splitter and a dichroic filter.

10. The apparatus according to claim 8, wherein the one or more controlled parameters include one or more of aperture size, focus or magnification of the vision system for image acquisition.

11. The apparatus according to claim 8, wherein the processor device is configured to identify movement of the object based on multiple distances successively determined based on the reflected light received at the receiver and to control one or more of movement or focus of the vision system based on the identified movement.

12. The apparatus according to claim 8, wherein the vision system further comprises:
   a plurality of image sensors configured to acquire images of the object from different angles;
   wherein the processor device is configured to determine 3D information for the object based on the acquired images and the determined distance between the lens and the object.

13. A method for acquiring an image of a symbol on an object using a vision system having at least one lens, the method comprising:
   projecting a first light beam to the object coaxially with a reader optical axis of the vision system, to project an aimer pattern on the object;
   receiving reflected light from the object based on the first light beam, coaxially with the reader optical axis;
   directing the reflected light to an axis different from the reader optical axis;
   determining, using one or more processor devices, a distance between the at least one lens of the vision system and the object based on the reflected, directed light from the first light beam;
   determining, using the one or more processor devices, a desired optical power for the at least one lens based on the determined distance;
   adjusting, using the one or more processor devices, a focus of the at least one lens based on the desired optical power; and
   acquiring an image of the symbol on the object.

14. The method according to claim 13, wherein acquiring an image of the symbol on the object comprises:
   projecting an illumination light on the object; and
   receiving reflected illumination light from the object;
   wherein the first light beam has a first wavelength and the illumination light has a second wavelength that is different from the first wavelength.

15. The method according to claim 13, further comprising, before acquiring the image, deactivating the first light beam.

16. The method according to claim 13, further comprising:
   based on the determined distance, adjusting one or more of an illumination intensity, an exposure time, an aperture setting, or a gain for acquisition of the image.

17. The method according to claim 13, further comprising:
   determining a dimension of one or more of the object or a symbol on the object based on the acquired image and the determined distance.

18. The method according to claim 13, further comprising:
   determining a second distance between the lens of the vision system and the object based on the reflected, directed light from the first light beam; and
   determining a movement of the object based on the determined distances.

19. The method according to claim 18, further comprising:
   automatically moving the vision system to track the determined movement of the object.

* * * * *